US012272010B2

United States Patent
Dent et al.

(10) Patent No.: US 12,272,010 B2
(45) Date of Patent: Apr. 8, 2025

(54) OBJECT DETECTION AND ANCHOR POSITION AND ORIENTATION RESOLUTION FOR AUGMENTED REALITY (AR) APPLICATIONS

(71) Applicant: NCR Atleos Corporation, Atlanta, GA (US)

(72) Inventors: Michael Anthony Dent, Perth (GB); Kyle Joseph Monaghan, Dundee (GB); Joseph Michael Gripo Tolentino, Cebu (PH); Gwyneth Dela Cruz Valdehueza, Cebu (PH)

(73) Assignee: NCR Atleos Corporation, Atlanta, GA (US)

( * ) Notice: Subject to any disclaimer, the term of this patent is extended or adjusted under 35 U.S.C. 154(b) by 260 days.

(21) Appl. No.: 17/956,041

(22) Filed: Sep. 29, 2022

(65) Prior Publication Data

US 2024/0112417 A1    Apr. 4, 2024

(51) Int. Cl.
*G06T 19/00* (2011.01)
*G06T 7/246* (2017.01)
*G06T 7/73* (2017.01)
*G06V 20/20* (2022.01)

(52) U.S. Cl.
CPC ............ *G06T 19/006* (2013.01); *G06T 7/251* (2017.01); *G06T 7/75* (2017.01); *G06V 20/20* (2022.01); *G06T 2207/10016* (2013.01)

(58) Field of Classification Search
CPC ......... G06T 19/006; G06T 7/75; G06T 7/251; G06T 2207/10016; G06V 20/20; G06F 3/011
See application file for complete search history.

(56) References Cited

U.S. PATENT DOCUMENTS

| 7,511,722 | B1 * | 3/2009 | Ollmann | G06T 3/606 |
| | | | | 345/568 |
| 2005/0083328 | A1 * | 4/2005 | Ueda | G06T 17/205 |
| | | | | 345/419 |
| 2013/0127980 | A1 * | 5/2013 | Haddick | G06F 3/013 |
| | | | | 348/14.08 |
| 2015/0177414 | A1 * | 6/2015 | Gao | G01W 1/16 |
| | | | | 702/4 |
| 2019/0026922 | A1 | 1/2019 | Kellogg et al. | |
| 2019/0370544 | A1 | 12/2019 | Wright, Jr. et al. | |

(Continued)

FOREIGN PATENT DOCUMENTS

KR         101159420        6/2012

*Primary Examiner* — Phi Hoang
(74) *Attorney, Agent, or Firm* — Schwegman Lundberg & Woessner, P.A.

(57) ABSTRACT

Interesting features of an object within a physical environment are identified from a video of the physical environment. A model of the object is obtained, the model includes dimensions of the object. A first array is maintained with the pixel coordinates of the identified features within the video. A second array is maintained with the dimensions of the features obtained from the model. A processing framework is provided for using the first and second arrays and estimating, updating, and tracking the anchor pose in the physical environment within the video along with any AR generated objects placed in the video. The framework provided to an Augmented Reality (AR) app to initiate an AR session and to maintain the session.

12 Claims, 3 Drawing Sheets

(56) References Cited

U.S. PATENT DOCUMENTS

| | | | |
|---|---|---|---|
| 2020/0126445 A1* | 4/2020 | Tan | G06T 11/00 |
| 2020/0175272 A1* | 6/2020 | Havnør | G06V 20/58 |
| 2021/0053407 A1* | 2/2021 | Smith | B65G 69/2882 |
| 2021/0327146 A1* | 10/2021 | Buerli | G02B 27/017 |
| 2022/0207816 A1* | 6/2022 | Marra | G06T 7/70 |
| 2022/0295040 A1 | 9/2022 | Jayaram et al. | |
| 2022/0327786 A1* | 10/2022 | Chen | G06F 16/487 |
| 2023/0087261 A1* | 3/2023 | Unnikrishnan | G06T 7/20 |
| | | | 382/100 |

* cited by examiner

OBJECT DETECTION AND ANCHOR POSITION AND ORIENTATION RESOLUTION FOR AUGMENTED REALITY (AR) APPLICATIONS

BACKGROUND

Augmented Reality (AR) applications rely on an anchor object being identified in a real-world three-dimensional (3D) space for purposes of configuring the applications for an AR session. The applications use the position and orientation known for the anchor in the 3D space to resolve positions and orientations of other real-world objects being captured in a video feed relative to the anchor. This permits the applications to map the physical environment and its objects within the video feed during the session.

Once the physical environment is mapped using the anchor, AR generated objects can be rendered and superimposed within the video feed during the session. Conventionally, anchors are identified via makers placed on real-world objects within a physical environment or via point-cloud 3D models. Markers add costs associated with manufacturing the markers, require the physical environment to be labeled, require finding a suitable surface within the physical environment to place the marker, and the marker can become degraded within the physical environment over time with normal wear and tear or due to conditions within the physical environment. Point-cloud models require additional user interaction to align a physical object from the physical environment with a representation of the object in the model causing session startup latency. Moreover a single model cannot adequately represent different configurations of complex physical objects within the physical environment (e.g., open doors, modules missing from a rack, etc.).

Preestablished marker-based anchor approaches and session initiation mapping of an anchor to a model are costly, time consuming, and deficient. Thus, there is a need by AR applications for improved real-world object detection with anchor resolution that maps a physical environment to a video feed during AR session initiation.

SUMMARY

In various embodiments, system and methods for anchor object detection and anchor position and orientation (hereinafter referred to as "pose") resolution during Augmented Reality (AR) session initiation are presented. Features of an object are identified from a video feed of a physical environment during AR session initiation. The features are mapped to screen coordinates within a two-dimensional 2D array. A computer-aided design (CAD) model for the object is obtained and the CAD dimensions and orientations for the features added to a three-dimensional (3D) array. A Perspective-n-Point (PnP) algorithm is processed using intrinsic features of the camera that provided the video feed, the 2D array, and the 3D array to estimate anchor object's pose in the real world with what is depicted in the video feed at any given point in time. This provides an AR framework to an AR app during AR session initialization; the framework is maintained for the AR app so that the anchor pose is dynamically tracked and updated as the video feed changes and as AR-generated objects are superimposed within the video feed by an AR application.

DETAILED DESCRIPTION

As stated above, AR session initiation is problematic for AR applications with marker-based anchor approaches physical objects are labeled with barcodes or Quick Response (QR) codes with model-based anchors physical objects have to be mapped to a model which may be incomplete. In addition, both approaches can experience startup session latency experienced by the end users of the AR application(s) (hereinafter referred to as "app(s)").

The teachings provided herein provide a dynamic and real-time technique by which an anchor object is identified and/or selected from an image or image frames of a video feed (herein after referred to as "video feed"). The video feed is captured of the physical environment during AR session initiation of an AR app by a camera of the device operated by a user. Interesting features of the anchor object are detected by matching features known for the anchor object with identified features from the video feed of the physical environment. The screen coordinates for features of the video feed and labeled within a two-dimensional (2D) array. The 2D array maintains a mapping of the interesting features of the anchor to corresponding screen positions on a display for each of the interesting features; for example, feature z has x pixel (width) coordinates and y pixel (height) coordinates within the video feed. A computer-aided design (CAD) model associated with the object is obtained. The CAD model is used to derive a 3D array or matrix. The 3D array includes the dimensions and the initial orientations associated with the interesting features of the object relative to the CAD model origin. The detected features are recorded in the 2D array by their labels and screen coordinates. Next, intrinsic camera parameters for the camera that is providing the video feed are obtained for the camera's focal length, lens distortion, etc. The pose (orientation and position) of the anchor within the physical environment relative to the camera is estimated using the 2D array for the features, the 3D array for the features, the intrinsic camera parameters, and a Perspective-n-Point (PnP) algorithm. This provides an initial and ongoing framework by which the anchor pose is continually re-calculated and updated along with any AR-generated objects superimposed within the AR session as the video feed changes during the session for the AR app.

As will be discussed herein and below, an anchor object does not require physical environment labeling of markings and does not require point-cloud model mappings for purposes of initializing an AR session for an AR app for a given physical environment. This allows the AR framework of the physical environment to initialize faster than what is conventionally available to AR apps because the framework does not need to detect planes, image markers, nor 3D point-cloud models.

Figure 1:
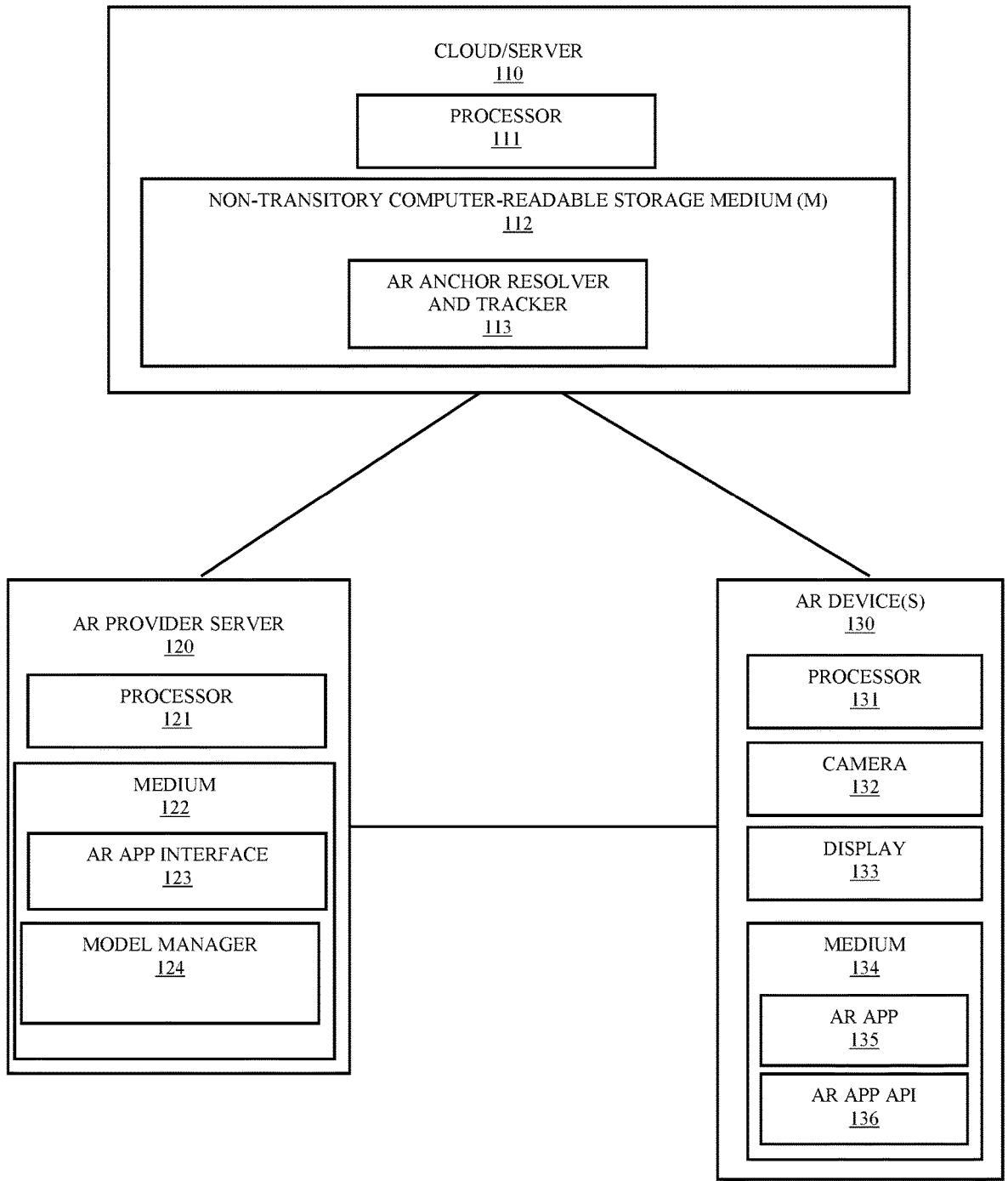
FIG. 1 is a diagram of a system for anchor object detection and anchor pose resolution during AR session initiation, according to an example embodiment.

FIG. 1 is a diagram of a system 100 for anchor object pose resolution during an AR session, according to an example embodiment. It is to be noted that the components are shown schematically in greatly simplified form, with only those components relevant to understanding of the embodiments being illustrated.

Furthermore, the various components (that are identified in FIG. 1) are illustrated and the arrangement of the components is presented for purposes of illustration only. It is to be noted that other arrangements with more or less components are possible without departing from the teachings of anchor object pose resolution during an AR session presented herein and below.

System 100 includes a cloud 110 or a server 110 (hereinafter just "cloud 110"), an AR provider server 120, and AR-operated devices 130. Cloud 110 includes a processor 111 and a non-transitory computer-readable storage medium 112 (herein after referred to as "medium 112"), which includes executable instructions for an AR anchor resolver and tracker 113. Processor 111 obtains or is provided the executable instructions from medium 112 causing processor 111 to perform operations discussed herein and below with respect to 113.

AR provider server 120 includes at least one processor 121 and medium 122, which includes instructions for an AR app interface 123 and a model manager 124. Processor 121 obtains or is provided the instructions from medium 122 causing processor 121 to perform operations discussed herein and below with respect to 123 and 123.

Each AR-operated device 130 includes a processor 131, a camera 132, a display 133, and a medium 134, which includes executable instructions for an AR app 135 and an AR app Application Programming Interface (API) 136. Processor 131 obtains or is provided the executable instructions from medium 134 causing processor 131 to perform operations discussed herein and below with respect to 135 and 136.

System 100 is described from the perspective of a composite real-world object placed in a physical environment. It is to be noted that this is done for purposes of illustration and comprehension and that such does not have to be the case in different embodiments of the teachings. The composite real-world object is a transaction terminal in the examples that follow. The terminal can be an automated teller machine (ATM), a self-service terminal (SST), a point-of-sale (POS) terminal, or a kiosk. However, it is noted that other complex objects can be used as well, such as a vehicle, a robot, a piece of machinery, a piece of equipment, etc. In an embodiment, the composite real-world object is an entire room that includes other objects known to be present in the room.

The complex real-world object is associated with a model data structure that defines the components of the complex real-world object by each component's 3D dimensions (height, width, and length) and various available orientations of each component relative to one another within the complex real-world object. In an embodiment, the model data structure is a CAD model of the complex real-world object however it is noted that other customer-defined model data structures may be used as well.

An AR provider provides an AR app 135 to a user of device 130 for purposes of providing to the user an AR service through AR app interface 123. For example, an AR provider may provide an AR app interface 123 and corresponding AR app 135 to a customer engineer that performs maintenance and support on ATMs (e.g., one type of composite real-world object). A model data structure for the ATM is maintained on the AR provider service 120 by model manager 124.

The AR app 134 provided by the AR provider is enhanced with the teachings presented herein and below to interact with AR app API 136. AR app API 136 interacts with model manager 124 and AR anchor resolver and tracker 113 for purposes of establishing an AR framework to initializes an AR session via AR app 135 for establishing a pose of an anchor object and for purposes of tracking and updating the anchor object's pose along with any AR-generated objects during the AR session by AR app interface 123 within AR app 135.

During initialization of an AR session, AR app 135 uses AR app API 136 to obtain an array of 3D coordinates of detected features (derived from a CAD model) for a complex real-world object present in the physical environment of a user. The array is provided to AR anchor resolver and tracker along with a live video captured by camera 132 of the physical environment as the user operates device 130 and initiates an AR session between AR app 135 and AR app interface 123.

AR anchor resolver and tracker 113 performs computer vision on the images from the video that depicts the physical environment for purposes of identifying one or more interesting features of the complex real-world object within the physical environment. The one or more interesting features are predefined for the complex real-world object and maintained by AR anchor resolver and tracker 113 based on their relatively small physical size and unique visual characteristics. The AR anchor resolver and tracker 113 identifies three or more of the features from the initial image frames provided with the video. The pixel coordinates of the features within the video are maintained in a 2D array. The 3D dimensions of the features are maintained in a 3D array using the model data structure. Intrinsic camera parameters for camera 132 are obtained from AR app 135 via AR app API 136. The intrinsic camera parameters include, by way of example only, the camera's focal length, lens distortion, etc.

AR anchor resolver and tracker 113 then establishes a framework by which the complex real-world object is used to define an anchor object for the AR session and by which the pose of the anchor object as it appears in the real-world can be estimated, tracked, and updated within the video during the session. Any AR-generated objects do not need to be tracked because they are attached to the AR anchor. The framework processes a PnP algorithm using the 2D array for the detected features of the object, the 3D array for the features of the object, and the intrinsic camera parameters. Thus, as the video changes the AR anchor resolver and tracker 113 uses the framework to update the pose of the anchor object and therefore the attached AR generated objects within the video. The video streamed directly to the display 133 for the user during the session.

In an embodiment, the complex real-world object is an ATM, and the user is a customer engineer perform maintenance on the ATM. The AR provider is an ATM support organization that provides an AR maintenance app 135 to the customer engineer via an AR device 130, which can be a phone, a tablet, a laptop, a wearable processing device such as a headset or goggles. When the app 135 initializes the ATM's origin and pose within the video captured by camera 132 are estimated using the framework discussed above. The AR app 135 interacts with AR app interface 123 to identify a component model of the ATM that the engineer needs to remove and replace by using the origin and pose of the ATM to identify the module and play an instructional video on top of the live video being captured by camera 132 and displays the live video and the instructional video superimposed thereon on display 133 for the engineer to see. When the engineer inserts a hand to grab the module if the module is not the correct module, the interface 123 can place an AR-rendered X on the hand within the video using the framework being provided by AR anchor resolver and tracker 113. The session continues until the engineer successfully replaced the module with the assistance of app 135, interface 123, and based on the framework provided through AR anchor resolver and tracker 113.

In an embodiment, the AR anchor resolver and tracker 113 is processed on AR provider server 120. In an embodiment, model manager 125 is processed on cloud 110. In an embodiment, the AR app 135 is further enhanced to process the AR anchor resolver and tracker 113. In an embodiment, the AR anchor resolver and tracker 113 is provided to AR app 135 and/or AR app interface 123 as a software-as-a-service (SaaS).

System 100 improves the startup initialization time of AR app 135 and the response times during the AR session with interface 123 by providing a framework that is not based on labeled surfaced within the physical environment nor based on mapping real-world objects to point-cloud models. Instead features of an object are used to dynamically resolve an anchor for the AR session using known dimensions of the features from a model data structure, such as a CAD model. The anchor object's origin and pose are estimated, and a framework is established from a 2D array for the features, a 3D array for the features, and intrinsic camera features of the camera 132 and processed by a PnP algorithm to continuously maintain, track, and update the anchor object's pose and the poses of any AR generated objects relative to the anchor object's pose. This improves response times of AR apps 135 and AR interfaces 123.

Figure 2:
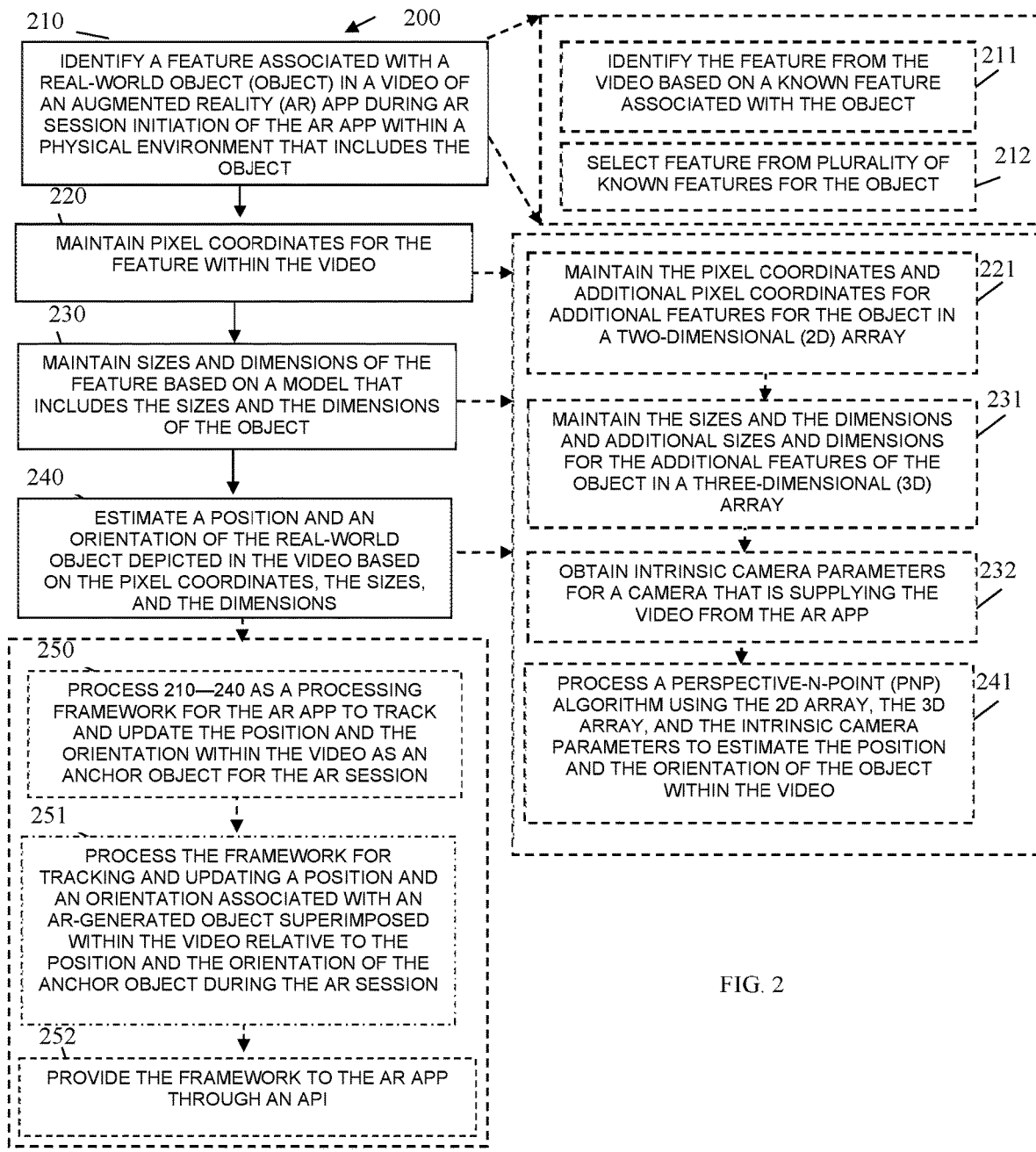
FIG. 2 is a flow diagram of a method for anchor object detection and anchor pose resolution during an AR session, according to an example embodiment.

The above-referenced embodiments and other embodiments are now discussed with reference to FIGS. 2 and 3. FIG. 2 is a flow diagram of a method 200 for anchor object pose resolution during an AR session, according to an example embodiment. The software module(s) that implements the method 200 is referred to as an "AR anchor pose manager." The AR anchor pose manager is implemented as executable instructions programmed and residing within memory and/or a non-transitory computer-readable (processor-readable) storage medium and executed by one or more processors of one or more devices. The processor(s) of the device(s) that executes the AR anchor pose manager are specifically configured and programmed to process the AR anchor pose manager. The AR anchor pose manager has access to one or more network connections during its processing. The connections can be wired, wireless, or a combination of wired and wireless.

In an embodiment, the device that executes AR anchor pose manager is cloud 110. In an embodiment, the device that executes AR anchor pose manager is server 110. In an embodiment, the devices that executes terminal media baseline predictor is AR provider server 130. In an embodiment, the AR anchor pose manager is all of, or some combination of 113, 124, and/or 136.

At 210 AR anchor pose manager identifies a feature associated with a real-world object in a video of an AR app 135 during AR session initiation of the AR app 135 within a physical environment. The video depicts the real-world app within the physical environment.

In an embodiment, at 211, the AR anchor pose manager identifies the feature based on a known feature associated with the real-world object. In an embodiment, at 212, the AR anchor pose manager selects the feature from a plurality of known features associated with the real-world object.

At 220, the AR anchor pose manager maintains pixel coordinates for the feature within the video. The pixel coordinates identify within a screen rendered on the display 133 of the device where the feature is located within the screen. The x and y coordinates in 2D.

In an embodiment, at 221, the AR anchor pose manager maintains the pixel coordinates for the feature and additional pixel coordinates for additional features of the real-world object in a 2D array. In an embodiment, the additional pixel coordinates are for 1 or more additional features and are maintained in the 2D array for the feature and the additional features.

At 230, the AR anchor pose manager maintains 3D sizes and dimensions of the feature based on a model that includes the sizes and the dimensions of the real-world object. In an embodiment, the model is a CAD model for the real-world object and the CAD model includes the sizes and dimensions of the feature along with other features of the real-world object.

In an embodiment of 221 and 230, at 231, the AR anchor pose manager maintains the sizes and dimensions for the features and additional sizes and dimensions for the additional features within a 3D array. The sizes and dimensions may also include different possible orientations of the feature and the additional features for the real-world object.

In an embodiment of 231 and at 232, the AR anchor pose manager obtains intrinsic camera parameters for a camera 132 that is supplying the video from the AR app 135. The intrinsic camera parameters can include the camera's focal length, the lens distortion, etc.

At 240, the AR anchor pose manager estimates a position and an orientation of the real-world object depicted in the video based on the pixel coordinates, the sizes, and the dimensions. This is based on the position of the feature within the screen that is rendering the video and based on known sizes and dimensions of the feature obtained from the model.

In an embodiment of 232 and 240, at 241, the AR anchor pose manager processes a PnP algorithm using the 2D array, the 3D array, and the intrinsic camera parameters to estimate the position and the orientation of the real-world object within the video. That is, as the real-world object is oriented within the physical environment, its origin is estimated as the position within the video and its orientation is estimated within the video.

In an embodiment, at 250, the AR anchor pose manager (210-240) is processed as a processing framework for the AR app 135 to track and update the position and the orientation of the real-world object within the video as an anchor object for the AR session. In an embodiment, at 251, the AR anchor pose manager processes the framework for tracking and updating a position and an orientation associated with an AR-generated and rendered object that is superimposed within the video relative to the position and the orientation of the anchor object during the AR session on behalf of the AR app 135. In an embodiment, at 252, the AR anchor pose manager provides the framework to the AR app 135 through an API 136.

Figure 3:
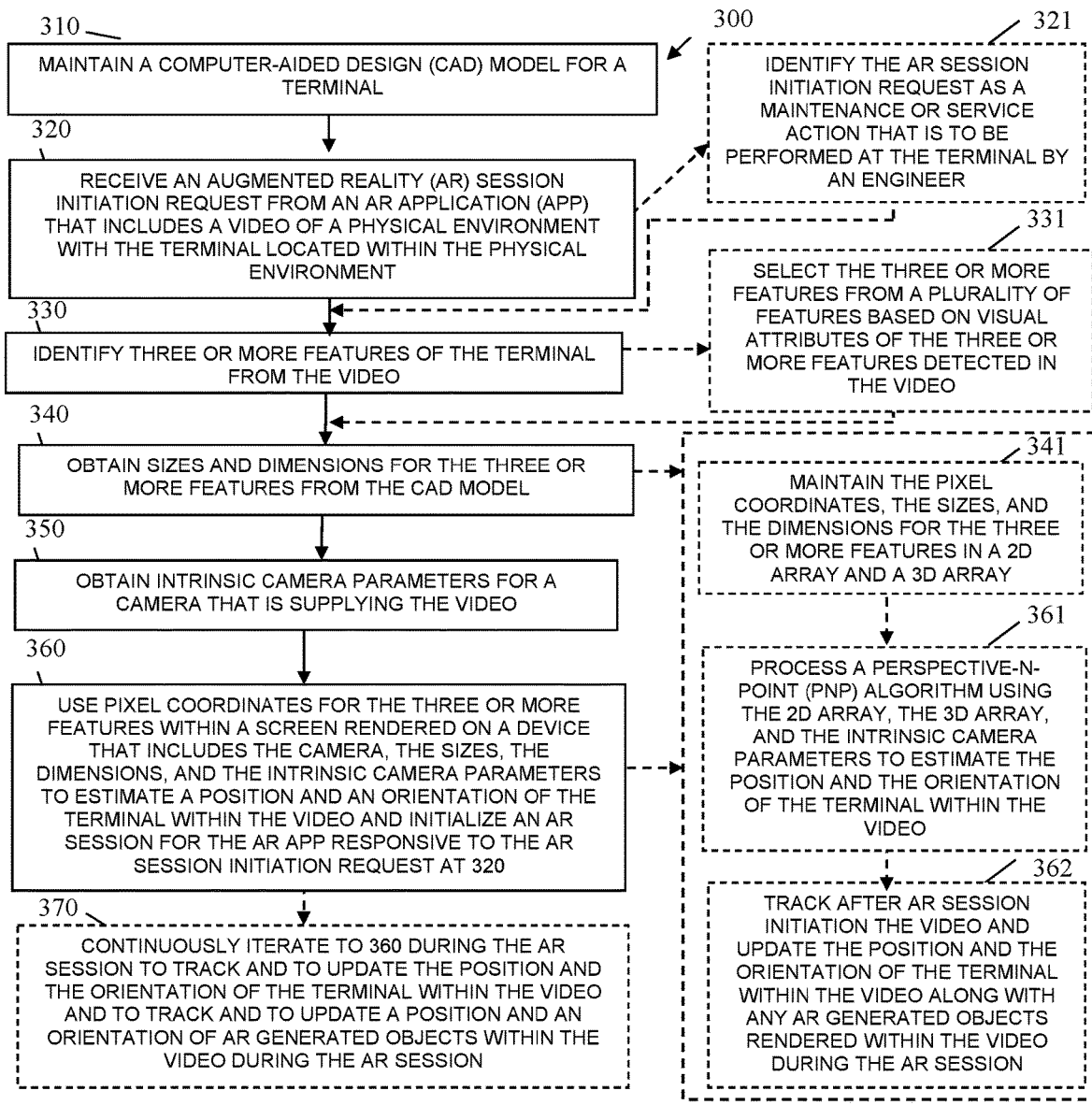
FIG. 3 is a flow diagram of another method for anchor object detection and anchor pose resolution during an AR session, according to an example embodiment.

FIG. 3 is a flow diagram of another method 300 for anchor object pose resolution during an AR session, according to an example embodiment. The software module(s) that implements the method 300 is referred to as an "AR tracking framework service." The AR tracking framework service is implemented as executable instructions programmed and residing within memory and/or a non-transitory computer-readable (processor-readable) storage medium and executed by one or more processors of one or more devices. The processor(s) of the device(s) that executes the AR tracking framework service are specifically configured and programmed to process the AR tracking framework service. The AR tracking framework service has access to one or more network connections during its processing. The network connections can be wired, wireless, or a combination of wired and wireless.

In an embodiment, the device that executes the AR tracking framework service is cloud 110. In an embodiment, the device that executes the AR tracking framework service is server 110. In an embodiment, the device that executes the AR tracking framework service is AR provider server 120.

In an embodiment, the AR tracking framework service is all of, or some combination of 113, 124, 136, and/or method 200. The AR tracking framework service presents another and, in some ways, enhanced processing perspective from that which was discussed above with the method 200 of the FIG. 2.

At 310, the AR tracking framework service maintains a CAD model for a terminal. The terminal is a composite or complex real-world object that includes a variety of modules or features associated with the terminal.

At 320, the AR tracking framework service receives an AR session initiation request from an AR app 135. The request includes a video of a physical environment with the terminal located within the physical environment.

In an embodiment, at 321, the AR tracking framework service identifies the AR session initiation request as a maintenance or service action, which is going to be performed or is being performed at the terminal by an engineer. The AR session is an AR maintenance session. It is noted that other types of AR sessions may be identified as well, such as gaming sessions, shopping sessions, etc.

At 330, the AR tracking framework service identifies three or more features of the terminal from the video. In an embodiment, at 331, the AR tracking framework service selects the three or more features from a plurality of features based on visual attributes of the three or more features detected in the video. For example, the three or more features are selected because they are the smallest or most unique features detectable from the video.

At 340, the AR tracking framework service obtains sizes and dimensions for the three or more features from the CAD model. The sizes and dimensions may also include the orientations available for each of the features within the terminal as defined in the CAD model.

In an embodiment, at 341, the AR tracking framework service maintains the pixel coordinates, the sizes, and the dimensions for the three or more features in a 2D array and a 3D array. This was discussed at length above with the discussions of system 100 and method 200.

At 350, the AR tracking framework service obtains intrinsic camera parameters for a camera 132 that is supplying the live video of the physical environment. The intrinsic camera parameters can include the camera's focal length, lens distortion values, etc.

At 360, the AR tracking framework service uses the pixel coordinate for the three or more features within the screen rendered on a device 130 that includes the camera 132, the sizes, the dimensions and the intrinsic camera parameters to estimate a position and an orientation of the terminal within the video. The AR tracking framework service initializes an AR session for the AR app 135 responsive to the AR session initiation request at 320.

In an embodiment of 341 and 360, at 361, the AR tracking framework service processes a PnP algorithm using the 2D array, the 3D array, and the intrinsic camera parameters to estimate the position and the orientation of the terminal within the video. In an embodiment of 361 and at 362, the AR tracking framework service tracks, after AR session initiation the video and updates the position and the orientation of the terminal within the video along with any AR-generated objects rendered within the video during the AR session.

In an embodiment, at 370, the AR tracking framework service continuously iterates to 360 during the AR session to track and to update the position and the orientation within the video. The AR tracking framework service also tracks and updates a position and an orientation of AR-generated objects superimposed on the video during the AR session.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   identifying a feature associated with a real-world object in a video of an Augmented Reality (AR) application (app) during AR session initiation of the AR app within a physical environment that includes the real-world object;
   maintaining pixel coordinates for the feature within the video;
   wherein maintaining the pixel coordinates further includes:
      maintaining the pixel coordinates for the feature and additional pixel coordinates for additional features of the real-world object in a two-dimensional (2D) array;
   maintaining sizes and dimensions of the feature based on a model that comprises sizes and dimensions of the real-world object;
   wherein maintaining the sizes further includes:
      maintaining the sizes and dimensions for the feature and additional sizes and dimensions for the additional features of the real-world object in a three-dimensional (3D) array; and
   estimating a position and an orientation of the real-world object as depicted in the video based on the pixel coordinates, the sizes of the feature, and the dimensions of the feature;
   wherein estimating further includes:
      obtaining intrinsic camera parameters for a camera that is supplying the video from the AR app; and wherein estimating further includes processing a Perspective-n-Point algorithm using the 2D array, the 3D array, and the intrinsic camera parameters to estimate the position and the orientation of the real-world object within the video.

2. The method of claim 1 further comprising, processing the method as a framework for the AR app to track and update the position and the orientation of the real-world object within the video as an anchor object for the AR session.

3. The method of claim 2 further comprising, processing the framework for tracking and updating a position and an orientation associated with an AR-generated object superimposed within the video relative to the position and orientation of the anchor object by the AR app during the AR session.

4. The method of claim 3 further comprising, providing the framework to the AR app through an Application Programming interface.

5. The method of claim 1, wherein identifying further includes identifying the feature from the video based on a known feature associated with the real-world object.

6. The method of claim 1, wherein identifying further includes selecting the feature from a plurality of know features associated with the real-world object.

7. A method, comprising:
maintaining a computer-aided design (CAD) model for a terminal;
receiving an Augmented Reality (AR) session initiation request from an AR application (app) that comprises a video of a physical environment with the terminal located within the physical environment;
identifying three or more features of the terminal from the video;
obtaining sizes and dimensions for the three or more features from the CAD model;
wherein obtaining the sizes further includes:
maintaining pixel coordinates, the sizes, and the dimensions for the three or more features in a two-dimensional (2D) array and a three-dimensional (3D) array;
obtaining intrinsic camera parameters for a camera that is supplying the video; and
using pixel coordinates for the three or more features within a screen rendered on a device that comprises the camera, the sizes, the dimensions, and the intrinsic camera parameters to estimate a position and an orientation of the terminal within the video and initializing an AR session for the AR app responsive to the AR session initiation request;
wherein using further includes:
processing a Perspective-n-Point (PnP) algorithm using the 2D array, the 3D array, and the intrinsic camera parameters to estimate the position and the orientation of the terminal within the video.

8. The method of claim 7 further comprising, continuously iterating to the using during the AR session to track and to update the position and the orientation of the terminal within the video and to track and to update a position and an orientation of AR generated objects within the video during the AR session.

9. The method of claim 7, wherein receiving further includes identifying the AR session initiation request as a maintenance or service action that is to be performed at the terminal by an engineer.

10. The method of claim 7, wherein identifying further includes selecting the three or more features from a plurality of features based on visual attributes of the three or more features detected in the video.

11. The method of claim 7 further comprising tracking after AR session initiation the video and updating the position and the orientation of the terminal within the video along with any AR-generated objects rendered within the video during the AR session.

12. The method of claim 7 further comprising, providing the method as a cloud-based software-as-a-service (SaaS) to the AR app.

* * * * *